United States Patent [19]

Hara

[11] Patent Number: 4,620,092

[45] Date of Patent: Oct. 28, 1986

[54] ELEVATION ANGLE MEASURING DEVICE WITH APPARATUS FOR DISABLING THE DEVICE WHEN ITS INCLINATION ANGLE IS OFFSET FROM A PREDETERMINED INCLINATION ANGLE

[75] Inventor: Masato Hara, Tokyo, Japan

[73] Assignee: Asahi Kogaku Kogyo Kabushiki Kaisha, Tokyo, Japan

[21] Appl. No.: 553,946

[22] Filed: Nov. 21, 1983

[30] Foreign Application Priority Data

Nov. 24, 1982 [JP] Japan ............................ 57-177448[U]

[51] Int. Cl.$^4$ ............................................. G01B 11/26
[52] U.S. Cl. .............................. 250/231 SE; 33/1 PT; 356/152
[58] Field of Search ............... 250/231 SE, 237 G; 33/1 PT, 1 T, 267, 281, 283; 356/141, 152

[56] References Cited

U.S. PATENT DOCUMENTS

| 4,136,955 | 1/1979 | Aeschlimann et al. ............ 33/1 PT |
| 4,318,225 | 3/1982 | Jenkinson ..................... 250/231 SE |
| 4,449,191 | 5/1984 | Mehnert ....................... 250/231 SE |
| 4,466,189 | 8/1984 | Tobin, Jr. ..................... 250/231 SE |

FOREIGN PATENT DOCUMENTS

82/02631  8/1982  PCT Int'l Appl. ........... 250/231 SE

Primary Examiner—Edward P. Westin
Attorney, Agent, or Firm—Sughrue, Mion, Zinn, Macpeak, and Seas

[57] ABSTRACT

An elevation angle measuring device is designed to compensate for a slight inclination of the device. A vertical hanging member having a slit is arranged such that the slit acts as a photoelectric passage mask for a detector when the device has an inclination angle substantially equal to zero. The device is disabled by the vertical hanging member when the inclination angle of the device is not substantially equal to zero.

11 Claims, 3 Drawing Figures

4,620,092

ELEVATION ANGLE MEASURING DEVICE WITH APPARATUS FOR DISABLING THE DEVICE WHEN ITS INCLINATION ANGLE IS OFFSET FROM A PREDETERMINED INCLINATION ANGLE

FIELD OF THE INVENTION

The present invention relates to an elevation angle measuring device, and more particularly to an elevation angle measuring device in which a slight inclination thereof is corrected during measurement to measure absolute angles of elevation.

BACKGROUND OF THE INVENTION

A conventional elevation angle measuring device comprises: a rotary disc which is turned at a constant speed and has a slit at a predetermined position; a reference point photoelectric detector fixedly arranged in the rotation area of the rotary disc; and a measurement point photoelectric detector installed on a rotary arm which is coaxial with the rotary disc. The device detects the output signals which are provided when the slit of the rotary disc passes through the measurement point photoelectric detector which has been turned towards the measurement point and the reference point photoelectric detector which has been fixed, to obtain the aimed angle of elevation according to the following expression:

Aimed Angle of Elevation=360 (degrees) x (time required for the rotary disc to turn from the reference point to the measurement point)/(time required for the rotary disc to make one revolution).

In measuring an angle of elevation with the conventional device, it is impossible to correct for the inclination of the device itself. In order to measure an absolute angle of elevation with the vertical axis at the absolute zero degree, it is essential to hold the device completely horizontal; however, in practical measurement, it is substantially impossible to avoid causing a slight inclination with the device.

SUMMARY OF THE INVENTION

In view of the foregoing, an object of this invention is to provide an elevation angle measuring device in which a slight inclination thereof must be corrected prior to measurement, to thereby effect measurement of absolute angles of elevation.

The foregoing object of the invention model has been achieved by the provision of an elevation angle measuring device in which, according to the present invention, a vertical hanging member having a slit is arranged, as a photoelectric passage mask, in the reference point photoelectric detector, and the reference point photoelectric detector produces an output signal when the slit of the rotary disc passes through the position where the slit is laid over the slit of the vertical hanging member, i.e., the absolute position.

DETAILED DESCRIPTION OF THE PREFERRED EMBODIMENTS

One example of an elevation angle measuring device according to the present invention will be described with reference to the accompanying drawings.

Figure 1:
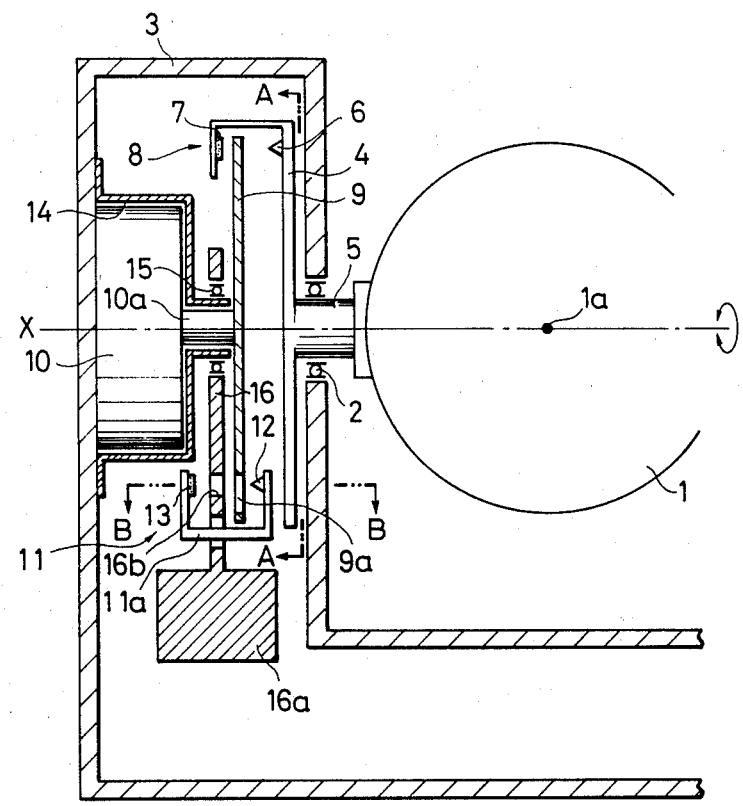
FIG. 1 is a vertical sectional view showing the essential components of an elevation angle measuring device according to the present invention.

In FIG. 1 there is shown a collimating telescope 1, for setting the collimation line to an object to be measured, which is rotatably supported through a bearing 2 by a frame 3. The telescope is fixedly secured to the outer end of a main shaft 5 which shaft is perpendicular of the central axis 1a of the collimating telescope 1.

An arm 4 has a substantially U-shaped end portion, and a light source 6 and a photoelectric conversion element 7 are installed on two inner walls of the U-shaped end portion and are positioned to confront each other, thus forming a measurement point photoelectric detector 8.

A rotary disc 9 which is turned at a constant speed is fixedly mounted on the rotary shaft 10a of a motor 10. The shaft 10a rotates at a constant speed about an axis which is on the extension of the rotating axis x of the main shaft 5 of the collimating telescope 1. The rotary disc 9 has a slit 9a in its peripheral portion. As the disc 9 turns, the slit 9a is passed through the photoelectric detector 8.

A reference point photoelectric detector 11 is secured to the frame 3 and has a substantially U-shaped body 11a. A light source 12 and a photoelectric conversion element 13 are installed on two inner walls of the U-shaped body 11a, and are positioned to confront each other, thus forming the reference point photoelectric detector 11. The detector 11 is positioned in an area through which the slit 9a of the rotary disc 9 passes, and on a vertical line extended from the center of rotation x of the slit 9a.

The motor 10 and the rotary shaft 10a are covered with a housing 14. A vertical hanging member 16 having a weight 16a at its lower end is pivotally mounted through a bearing 15 on the portion of the housing 14 which covers the rotary shaft 10a.

Figure 3:
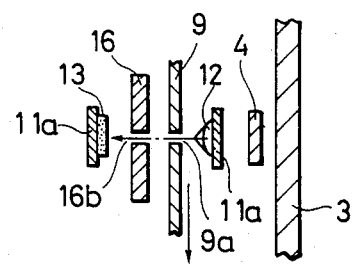
FIG. 3 is an explanatory diagram as viewed in the direction of the arrow B—B in FIG. 1 showing some of the essential components.

The vertical hanging member 16 intersects the phantom line which is extended between the light source 12 and the photoelectric conversion element 13 of the reference point photoelectric detector 11, and it has a slit 16b at the point of intersection. FIG. 3 shows more clearly the relationship between the measurement point photoelectric detector 8, rotary disc 9, vertical hanging member 16, arm 4 and frame 3.

Figure 2:
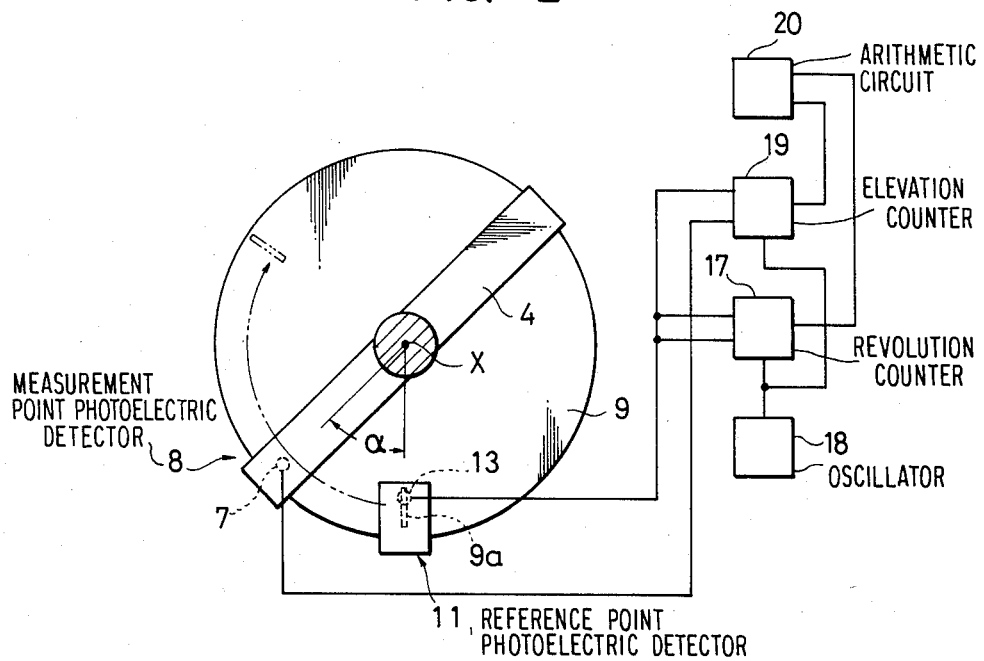
FIG. 2 is an explanatory diagram as viewed in the direction of the arrow A—A in FIG. 1, showing an arm 4 which has been turned through 135° from its position shown in FIG. 1.

The output signals of the measurement point photoelectric detector 8 and the reference point photoelectric detector 11 are applied to a one-revolution counter 17 and an elevation angle counter 19 as shown in FIG. 2. These counters 17 and 19 are connected to an oscillator 18 and an arithmetic circuit 20.

The one-revolution counter 17 starts counting pulses from the oscillator 18 in response to a signal which is provided when the slit 9a passes through the reference point photoelectric detector 11, and ends the counting operation in response to a signal which is produced when the slit 9a comes to the detector 11 again.

On the other hand, the elevation angle counter 19 starts counting pulses from the oscillator 18 in response to the signal which is provided when the slit 9a passes through the reference point photoelectric detector 11, and ends the counting operation in response to a signal which is produced when the slit 9a reaches the measurement point photoelectric detector 8.

The arithmetic circuit 20 performs a calculation according to the following expression by using the detection signals of the counters 17 and 19, to obtain the angle of elevation of the object under measurement:

Measurement angle (a) =

$$360 \text{ (degrees)} \times \frac{\text{count value of the counter 19}}{\text{count value of the counter 17}}$$

With the elevation angle measuring device thus constructed, when an object under measurement is aimed with the collimation line of the collimating telescope 1, the arm 4 and accordingly the measurement point photoelectric detector 8 is turned to a position corresponding to the angle of elevation of the object.

When, under this condition, the rotary disc 9 is turned one revolution by the motor 10, the one-revolution counter 17 and the measurement angle counter 19 are operated in response to the output signals of the detectors 11 and 8. That is, as was described before, the counter 17 counts pulses from the oscillator 18 for the time interval which elapses from the time instant that the slit 9a passes through the detector 11 until it passes through the detector 11 again; and the counter 19 counts pulses from the oscillator 18 for the time interval which elapses from the time instant that the slit 9a passes through the detector 11 until it reaches the detector 8. The arithmetic circuit 20 performs an elevation angle calculation according to the count value detection signals of the counters 17 and 19. The result of the elevation angle calculation is, for instance, digitally displayed on a display unit (not shown).

Even when the device itself is not held absolutely horizontal, the vertical hanging member 16 is held vertical by the weight 16a at all times and the slit 16b always indicates the absolute zero degree in elevation angle, whereby the reference point position can be corrected.

In the above-described example, two detectors, namely, the reference point photoelectric detector 11 and the measurement point photoelectric detector 8 are provided; however, the invention is not limited thereto or thereby; that is, the above-described device may be modified as described below.

The vertical hanging member 16 may be modified to extend upwardly, and another reference point photoelectric detector could be provided at a position which is opposite to the position where the firstly described reference point photoelectric detector is provided, while another measurement point photoelectric detector is provided on the other end of the arm 4, so that two pairs of photoelectric detectors are used to improve the accuracy of measurement. Furthermore, in the above-described example, the reference point photoelectric detector 11 is secured to the frame 3; however, it may be installed on the vertical hanging member 16.

As is apparent from the above description, in the elevation angle measuring device of the present invention a slight inclination of the device must be corrected prior to measurement, so that absolute angles of elevation will be measured at all times.

I claim:

1. An elevation angle measuring device of the type in which a rotary disc is turned at a constant speed and has a first slit at a predetermined position, a reference point photoelectric detector fixedly arranged along the rotational path of the rotary disc and a measurement point photoelectric detector installed on a rotary arm which is coaxial with said rotary disc and rotatable about its axis to a predetermined elevation angle, wherein output signals are provided when the slit of the rotary disc passes through said measurement point photoelectric detector, which has been aligned with said predetermined elevation angle, and when the slit of the rotary disc passes through said reference point photoelectric detector which has been fixed, thereby determining the angle of elevation between the position of the measurement point photoelectric detector and said fixed reference point, the improvement comprising; disabling means for enabling said device when the inclination angle of said device is substantially equal to a predetermined angle and for disabling said device when the inclination angle of said device is not substantially equal to said predetermined inclination angle.

2. An elevation angle measuring device, as claimed in claim 1, wherein said disabling means comprises a vertical hanging member having a second slit and arranged such that said second slit provides a photoelectric passage mask in said reference point photoelectric detector when the inclination angle of said device is substantially equal to said predetermined inclination angle, and said vertical hanging member obstructs said reference point photoelectric detector when the inclination angle of said device is not substantially equal to said predetermined inclination angle.

3. An elevation angle measuring device, as claimed in claim 2, wherein said means further comprises a weight attached to said hanging member.

4. An elevation angle measuring device, as claimed in claim 1, wherein said predetermined inclination angle is zero.

5. An elevation angle measuring device, as claimed in claim 2, wherein said predetermined inclination angle is zero.

6. An elevation angle measuring device of the type including measuring means for measuring the angle of inclination of an apparatus with respect to a support, said device further comprising disabling means for disabling said device in response to inclination of said support.

7. An elevation angle measuring device, as claimed in claim 6, wherein said apparatus is rotatable with respect to said support about a first axis and said measuring means comprises a rotatable disk having an aperture therein, a first detection means for detecting the passage of said aperture past a reference detection point fixed with respect to said support, a second detection means movable along the rotational path of said aperture in accordance with the rotation of said apparatus about said first axis, and means responsive to output signals from said first and second detection means for detecting the distance along said path between said first and second means.

8. An elevation angle measuring device, as claimed in claim 7, wherein said disabling means comprises a member having an enabling portion therein and rotatably mounted about said first axis, said member being asymmetrically weighted whereby said enabling portion is always disposed at a fixed position regardless of inclination of said support.

9. An elevation angle measuring device, as claimed in claim 8, wherein said member being asymmetrically weighted is heaviest in the vicinity of said enabling portion.

10. An elevation angle measuring device, as claimed in claim 8, wherein said first detection means is an optical detector including light emitting and light detecting means, and said enabling portion comprises a slit in said member.

11. An elevation angle measuring device, as claimed in claim 8, wherein said second detection means is an optical detector including light emitting and light detecting means.

* * * * *